United States Patent [19]

Donnelly et al.

[11] 4,442,080

[45] Apr. 10, 1984

[54] FLUID BED SOX/NOX PROCESS—"HYDRATED CALCINE ABSORPTION"

[75] Inventors: James R. Donnelly, Bailerup; Karsten S. Felsvang, Allerød; Per Morsing, Vedbak, all of Denmark; Preston L. Veltman, Severna Park, Md.

[73] Assignee: A/S Niro Atomizer, Soeborg, Denmark

[21] Appl. No.: 383,999

[22] Filed: Jun. 1, 1982

Related U.S. Application Data

[63] Continuation-in-part of Ser. No. 382,968, May 28, 1982.

[30] Foreign Application Priority Data

Oct. 12, 1981 [DK] Denmark ............................. 4507/81

[51] Int. Cl.$^3$ .......................... B01J 8/00; C01B 21/00; C01B 17/00
[52] U.S. Cl. ..................................... 423/239; 423/235; 423/242; 423/244
[58] Field of Search ................... 423/235, 235 D, 239, 423/239 A, 242 A, 242 R, 244 A, 230, 240, 244 R

[56] References Cited

U.S. PATENT DOCUMENTS

| | | | |
|---|---|---|---|
| 2,992,884 | 7/1961 | Bienstock et al. | 23/2 |
| 3,411,865 | 11/1968 | Pijpers et al. | 23/2 |
| 3,428,575 | 2/1969 | Pijpers et al. | 252/464 |
| 3,492,083 | 1/1970 | Lowicki et al. | 23/2 |
| 3,498,743 | 3/1970 | Kyllonen | 422/168 X |
| 3,501,897 | 3/1970 | Helden et al. | 55/73 |
| 3,505,008 | 4/1970 | Frevel et al. | 423/244 A |
| 3,784,676 | 1/1974 | Moss | 423/242 A |
| 3,792,571 | 2/1974 | Waki et al. | 55/74 |
| 3,880,618 | 4/1975 | McCrea et al. | 423/244 A X |
| 3,920,421 | 11/1975 | Collins | 55/73 |
| 3,969,482 | 7/1976 | Teller | 423/235 |
| 3,976,747 | 8/1976 | Shale | 423/244 |
| 4,001,384 | 1/1977 | Iwakura et al. | 423/551 |
| 4,079,118 | 3/1978 | Gorai | 423/235 |
| 4,081,513 | 3/1978 | Moss | 423/244 |
| 4,091,076 | 5/1978 | Vogel et al. | 423/244 |
| 4,105,744 | 8/1978 | Erdoess et al. | 423/244 X |
| 4,137,578 | 9/1979 | Mehta et al. | 423/235 |
| 4,177,158 | 12/1979 | Blue | 252/189 |
| 4,178,349 | 12/1979 | Wienert | 423/244 |
| 4,197,278 | 4/1980 | Gehri | 423/242 |
| 4,201,751 | 5/1980 | Holter et al. | 423/210 |
| 4,215,096 | 7/1980 | Sinha et al. | 423/241 |
| 4,273,750 | 6/1981 | Hollett, Jr. et al. | 423/244 |
| 4,273,751 | 6/1931 | Sinha et al. | 423/244 |
| 4,279,873 | 7/1981 | Felsvang et al. | 423/242 |
| 4,330,512 | 5/1982 | Lendstrom | 423/244 |

FOREIGN PATENT DOCUMENTS

| | | |
|---|---|---|
| 135333 | 7/1947 | Australia . |
| 653822 | 10/1964 | Belgium . |
| 2181988 | 7/1973 | France . |
| 405211 | 11/1978 | Sweden . |
| 411658 | 1/1980 | Sweden . |
| 413629 | 6/1980 | Sweden . |
| 1154009 | 6/1969 | United Kingdom . |
| 2009722 | 6/1979 | United Kingdom . |

OTHER PUBLICATIONS

Brown et al., "Interactions of Stack Gas Sulfur and Nitrogen Oxides on Dry Sorbents" National Environmental Research Center, North Carolina, Sep. 1973.

Primary Examiner—Gregory A. Heller
Attorney, Agent, or Firm—Schuyler, Banner, Birch, McKie & Beckett

[57] ABSTRACT

A process for simultaneous removal of sulfur oxides ($SO_x$) and nitrogen oxides ($NO_x$) from gaseous mixtures (such as flue gases and industrial waste gases) containing them which comprises contacting the gaseous mixture with a particulate alkaline earth hydroxide and reaction products of the gaseous mixture and the hydroxide maintained in a moving bed reactor (preferably a fluid bed reactor) at a temperature of about 85° C. to about 150° C. in the presence of water vapor and oxygen and in the substantial absence of liquid water. A baghouse or other particle removal means preferably is employed to extract solid material such as fly ash and reaction products from the gaseous mixture being treated and to further capture unreacted $SO_x/NO_x$.

21 Claims, 3 Drawing Figures

FLUID BED SOX/NOX PROCESS—"HYDRATED CALCINE ABSORPTION"

This application is a continuation-in-part of U.S. application Ser. No. 382,968, entitled "Process For Removal of Nitrogen Oxides and Sulfur Oxides From Waste Gases", of James R. Donnelly, Karsten S. Felsvang, Per Morsing and Preston L. Veltman, filed May 28, 1982.

BACKGROUND OF THE INVENTION

This invention generally is directed to a method of treating flue gas and other industrial waste gases to efficiently and economically neutralize or remove therefrom a substantial portion of the acid-forming gaseous component unfortunately resulting from combustion of fuels and processing organic waste materials. The invention is especially directed to a process for treating gaseous mixtures which contain oxides of sulfur and nitrogen, hereinafter referred to as $SO_x$ and $NO_x$.

Worldwide energy supply problems unfortunately have mandated burning larger quantities of fuels having higher sulfur content or chlorinated waste materials and the like. The acidic components of the resulting flue gases now present an extremely serious environmental hazard. Aside from the more readily apparent problems resulting from corrosion and contamination of the air which must be breathed, the acidic components of flue gas are considered as the major source of the "acid rain" currently threatening the ability of many lakes in North America to support life. It is not surprising therefore, that industry has engaged in an intensive search for efficient and economical methods of neutralizing the noxious acidic components of waste flue gases.

$SO_x$ and $NO_x$ may be contained in practically all flue gases. When coal, oil or gas is burned, the sulfur contained in such fuels is converted to $SO_x$ and becomes part of the flue gases. The $NO_x$ found in flue gases comes from two sources: either from the thermofixation of atmospheric nitrogen during the combustion process or from the chemically bound nitrogen in the fuel. In natural gas firing nearly all $NO_x$ results from thermofixation. In combustion of residual oil, crude oil, and coal, the contribution from fuel-bound nitrogen can be significant and with some fuels, predominant.

For the most part, $SO_x$ and $NO_x$ emission control have been handled as separate entities. Although efforts to effect simultaneous removal of these materials are reflected in the literature there is today no really satisfactory process which will efficiently and economically remove $SO_x$ and $NO_x$ from waste gases without producing water soluble reaction products and which thereafter will permit safe discharge of the "clean" flue gas to the atmosphere. For example, in U.S. Pat. No. 3,880,618 to McCrea et al. a regenerative process is disclosed wherein flue gas first is passed over alkalized alumina or an alkali metal oxide or carbonate at 75°–150° C. to simultaneously remove $SO_x$ and $NO_x$. The absorbant then is heated to 300°–400° C. to drive off NO, then heated to 600°–700° C. to drive off absorbed sulfur compounds. The absorbant then is cooled and recycled to the absorption step. No suggestion is made that an alkaline earth reagent such as calcium oxide of calcium hydroxide would be useful in the process. On the other hand, in Kyllonen U.S. Pat. No. 3,498,743, a process is taught for removal of $NO_2$ from "other gases" by contacting the gaseous mixture with alkali or alkaline earth metal carbonates or oxides in a fixed or fluid bed between ambient temperature and 200° C. in the presence of between 1000 and 8000 p.p.m. water vapor. However, Kyllonen nowhere suggests that $NO_x$ and $SO_x$ can be captured or removed in his process.

Prior art flue gas treating processes and especially desulfurization processes, have utilized a variety of absorbants including ammonia and the oxides, hydroxides and carbonates of the alkali and alkaline earth metals. Various absorbant flue gas contacting means have been used including solution or slurry/gas contacting absorption towers and various spray/gas contacting systems. Prior art processes often have been differentiated by the nature of the absorbant/$SO_x$ reaction product effluent. Thus, a "wet" sludge is produced from absorption scubbing towers and a "dry" reaction product is produced from spray drier absorption processes.

Flue gas $NO_x$ control means normally operate either through suppression of $NO_x$ formation or through physical or chemical removal of $NO_x$ from the flue gases. $NO_x$ formation can be suppressed by reducing the nitrogen level at peak flame temperature; decreasing oxygen level at peak flame temperature or by reducing peak temperature and residence time in the combusion zone. Chemical removal means have included both dry and wet processes. Dry processes include (1) catalytic decomposition, (2) selective catalytic reduction of $NO_x$ with $NH_3$, (3) non-selective catalytic reduction with reducing gases, (4) non-catalytic reduction $NH_3$ and (5) absorption by solids as in U.S. Pat. No. 3,498,743. The wet processes include (1) absorption in a liquid phase and oxidation of $NO_x$ to $NO_2/NO_3$, (2) gas phase oxidation followed by absorption and liquid phase reduction, (3) gas phase oxidation followed by absorption and liquid phase oxidation to $NO_2/NO_3$ and (4) absorption with a liquid phase reduction to $NH_{4+}$.

Both dry and wet processes for the simultaneous removal of $SO_x$ and $NO_x$ are described in the literature. The dry processes include: (1) selective catalytic reduction with ammonia and absorption of $SO_x$ by activated carbon; (2) selective catalytic reduction with ammonia and reaction of $SO_2$ with copper oxide; (3) absorption of $NO_x$ and $SO_x$ by solids such as alkalized alumina, sodium or potassium oxide or carbonate or ores thereof as in U.S. Pat. No. 3,880,618; and (4) electron beam radiation. The wet processes include: (1) absorption of $NO_x$ and $SO_2$ with liquid phase reduction of $NO_x$ to $N_2$ by $SO_2$; (2) absorption of $NO_x$ and $SO_2$ with liquid phase oxidation to NO—$_3$ and SO=$_4$; (3) gas phase oxidation of $NO_x$ and $SO_x$ with liquid phase reduction of $NO_x$ to $N_2$; and (4) gas phase oxidation of $NO_x$ and $SO_x$ with liquid phase oxidation of $NO_x$ to NO—$_3$. These processes are reviewed in an article by A. A. Siddiqi and J. W. Tenni of Arco Petroleum Products Company published in *Hydrocarbon Processing*, October, 1981. In this article, most flue gas treatment technology currently under commercial development is reviewed, providing good background material.

Most development of $SO_x/NO_x$ simultaneous removal has been conducted with the dry processes, especially selective reduction with $NH_3$, due to the complexity and cost of the wet processes. Wet $NO_x$ removal processes generally are not now considered economically viable as compared to the dry processes.

In general, dry flue gas treatment processes have the following advantage over wet processes:

I. Lower capital investment and lower annual revenue requirements;

2. Simpler processes and fewer equipment requirements;
3. Higher $NO_x$ removal efficiency;
4. More extensive testing in large units (mainly oil and gas fire boilers);
5. No waste generation.

However, dry processes available to date also have the following disadvantages:
1. Greater sensitivity to inlet particulate matter levels;
2. Requirements for $NH_3$ from either an energy source (natural gas) or more expensive coal gasification methods;
3. Possible emission of $(NH_4)_2SO_4$, $NH_4HSO_4$ and $NH_3$; and
4. Higher reaction temperature (350°–400° C.) which requires these systems to be placed in the power generation cycle before the boiler preheater or ancillary heating after the preheater.

In general wet $SO_x/NO_x$ processes currently available have the following advantages as compared to dry processing:
1. Simultaneous $SO_x/NO_x$ removal, which may provide economic advantage under certain applications;
2. Relative insensitivity to flue gas particulate matter;
3. High $SO_x$ reduction.

Major disadvantages of the wet processes include:
1. Higher costs because of insolubility of NO in aqueous solutions;
2. Formation of nitrates and other potential water pollutants;
3. More extensive equipment requirements;
4. Formation of low-demand by-products;
5. Need for flue gas preheat;
6. Moderate $NO_x$ removal efficiencies;
7. Usually are limited to high $SO_x/NO_x$ ratios.

OBJECTS OF THE INVENTION

Accordingly it is a principal object of this invention to provide an efficient and economical process for treating gaseous mixtures containing acid-forming gases to reduce the acid-forming gaseous content thereof.

It is a particular object of this invention to provide an efficient and economical process for treating gaseous mixtures containing $SO_x$ and $NO_x$ in which substantial amounts of the $SO_x$ and $NO_x$ simultaneously are removed from the gaseous mixtures without production of a liquid waste material.

It is a further object of this invention to provide an efficient and economical process for treating gaseous mixtures containing $SO_x$ and $NO_x$ in which substantial amounts of the $SO_x$ and $NO_x$ are simultaneously removed by contacting the gaseous mixture with an inexpensive, solid alkaline earth reagent.

It is a specific object of the invention to provide an efficient and economical process for treating gaseous mixtures containing $SO_x$ and $NO_x$ in which substantial amounts of the $SO_x$ and $NO_x$ are simultaneously removed by contacting the gaseous mixture with a reagent comprising solid alkaline earth hydroxide.

It is another object of this invention to provide an efficient and economical process for treating gaseous mixtures containing $SO_x$ and $NO_x$ in which substantial amounts of the $SO_x$ and $NO_x$ are simultaneously removed by contacting the gaseous mixture with a particulate solid comprising alkaline earth hydroxide in admixture with the solid reaction products of $SO_x$ and $NO_x$ and the alkaline earth hydroxide.

Yet another object of the invention is an efficient and economical process for treating gaseous mixtures to reduce the amount of acid-forming gaseous content of said mixture by contact with a solid particulate reagent comprising alkaline earth hydroxide contained in a bed fluidized by the gaseous mixture.

It is still a further object of the invention to provide an efficient and economical process for removal of acid-forming gases from gaseous mixtures which comprises contacting said gaseous mixture with a particulate reagent comprising alkaline earth hydroxide and reaction products of the hydroxide and the gaseous mixture in a bed of said material fluidized by the gaseous mixture and in which process particulate material is removed from the bed on a continuous basis and fresh reagent material is introduced into the bed on a continuous basis.

DESCRIPTION OF THE INVENTION

Generally described, the present invention comprises a process for treating a gaseous mixture containing acid-forming gaseous components which comprises providing a reactor containing particulate material wherein the particles are in motion relative to each other, said particles having a surface comprising an alkaline earth hydroxide reactable with the acid-forming components of said gaseous mixture in admixture with the reaction products of said gaseous mixture and the materials comprising said surface, contacting the particles in said reactor with the gaseous mixture at a temperature of between about 85° C. and about 150° C. in the presence of oxygen and water vapor but in the absence of a substantial quantity of liquid water, thereby substantially reducing the amount of acid-forming gaseous components in the gaseous mixture. While alkaline earth hydroxides and mixtures thereof are generally operable in the process of the invention calcium hydroxide and calcium hydroxide-magnesium hydroxide mixtures are the preferred reagents from the standpoint of efficiency and economy. Barium, magnesium and strontium hydroxides are operable as indicated.

Accordingly, in the process of the invention as generally described, a gaseous mixture comprising $SO_x$ and $NO_x$ may be contacted in a fluidized bed of particles comprising an alkaline earth (AE) hydroxide such as calcium hydroxide and the $AE(OH)_2/SO_x/NO_x/O_2/H_2O$ reaction products at a temperature between 85° C. and 150° C. for simultaneous $SO_x/NO_x$ removal. Effluent gases then may be passed through a particulate removal device such as a baghouse also preferably operated in the temperature range of 85°–150° C., in order that further simultaneous removal of $SO_x/NO_x$ may be accomplished. This process is believed to be unique because of:

1. The specific reagent created to capture both $SO_x$ and $NO_x$ simultaneously;
2. The highly specific reaction conditions found necessary to accomplish the simultaneous capture of $SO_x$ and $NO_x$;
3. The relatively attractive nature of the solid by-products formed;
4. The relative cost of process capital requirements; and
5. The relative simplicity and reliability of the operation.

This invention utilizes the fundamental discovery that $SO_x$ and $NO_x$ simultaneously can be captured on substantially anhydrous particulates comprising an alkaline earth hydroxide and its reaction products with $SO_x$ and $NO_x$. Such capture is not accomplished with particulates comprising such alkaline earth hydroxides in the presence of liquid water, for example, as such particulates conventionally are obtained by spray-drying an aqueous dispersion comprising an alkaline earth hydroxide, such as $Ca(OH)_2$, wherein the outlet temperature of the spray drier is near the adiabatic saturation temperature.

Aside from the critical temperature range which must be observed, it further has been found that effective simultaneous removal of $SO_x$ and $NO_x$ is not obtained unless the ratio of $NO_x$ to $SO_x$ is 3 or below; unless at least 0.5% by volume of oxygen (corresponding to 5,000 p.p.m.) is present and unless essentially all water present is in the vapor phase.

In accordance with more specific embodiments of the invention, the surface of the particles in the reactor may be formed in various ways. In one preferred method, the surface of the particles may be formed within the reactor by reaction of the acid-forming gaseous components with substantially anhydrous alkaline earth hydroxide formed on the particles by dehydration of a preformed aqueous solution or dispersion of an alkaline earth hydroxide such as calcium hydroxide, introduced to the reactor. Thus, there exists within the reactor a heterogeneous mass of particles. Some particles may have little or no aqueous material on their surfaces and are in substantial temperature equilibrium with the passing gases. Other particles may have small amounts of an aqueous phase comprising the alkaline reactant existing on their surfaces. The surface temperature of these particles is controlled by the progressive evaporation of the small amount of water from the particle surface. When the water is evaporated, leaving substantially anhydrous reagent, such as calcium hydroxide, the particle will assume the gas phase temperature.

In a second preferred embodiment, the alkaline earth hydroxide particles are formed within the reactor by reaction between an alkaline earth oxide, such as CaO, introduced into the reactor and water vapor. In this embodiment finely divided liquid water may be introduced into the reactor for temperature control and vapor phase reaction. However, since vaporization is practically instantaneous, there is essentially no opportunity for liquid phase hydration as is obtained in the classic lime slaking operation.

In a third preferred embodiment of the invention, the alkaline earth hydroxide may be produced outside of the reactor as by vapor phase hydration of an alkaline earth oxide. The finely divided, particulate hydroxide then is introduced into the reactor along with the flue gases being treated for $SO_x$ and $NO_x$ removal where the $Ca(OH)_2$ become transiently associated with the particles in the reactor.

In all of the alternative methods for forming the surface of particles employed in the reactor in accordance with the invention, some nucleating means is required. The nucleating particles may be particles of the reaction products present such as $CaSO_3$ and $CaSO_4$, may be inert particles of particulate ash or lime grits present. Inert, extraneous material, such as sand, also may be added.

In the preferred process in accordance with the invention, the reactor will contain a moving and, preferably, a fluidized bed of the aforesaid particles. On a continuous operating basis, bed material may be removed from the system, sized and selected material returned to the bed to maintain fluid bed volume and quality.

A specially preferred embodiment of the invention comprises a process for treating a gaseous mixture containing both $SO_x$ and $NO_x$ which comprises providing a fluidized bed of particles comprising an inert material (such as sand), passing a heated gaseous mixture containing $SO_x$ and $NO_x$ through the bed of particulates to maintain a temperature between about 85° C. and about 150° C. and to fluidize the particles, dispersibly introducing a solution or dispersion comprising calcium hydroxide to the bed, said solution or dispersion contacting the heated surfaces of the fluidized particles whereby water is quickly evaporated, calcium hydroxide is deposited on the particles and reactions with the $SO_x$ and $NO_x$ occur, and then passing the effluent gases from the fluidized bed to a particle separation device to remove particulates from the said gases.

Applicants do not know the exact role played by oxygen in the fundamental chemistry involved in this invention. However, it has been established that the presence of approximately 0.5% by volume of oxygen is necessary to obtain about 70% $NO_x$ removal in the presence of $SO_2$ and the various solid reaction products involved. It further has been found that if oxygen is totally removed from the system, $NO_x$ removal is reduced to essentially zero.

More is known about the functioning of water vapor in the reactions involved. First, it is well known that water vapor hydrates calcium oxide to form calcium hydroxide readily at about 100° C. Calcium hydroxide is stable below about 580° C. and reacts with $SO_2$ to form calcium sulfite at a rate increasing with temperature. In the presence of oxygen, calcium sulfite tends to form calcium sulfate. Hydrates of both calcium sulfite and calcium sulfate exist in the vicinity of 100° C. Applicants have found that water vapor is removed from the flue gases until all CaO is converted to $Ca(OH_2)$ and that thereafter, excess water vapor remains in the gas phase and exits the reactor.

It further has been found that the reaction between $SO_x$ and $NO_x$ can be accomplished on the surface of finely divided particles which are captured in the baghouse. In the examples subsequently set forth, about 95% of the $SO_x/NO_x$ capture was accomplished in the fluid bed reactor and about 5% of the $SO_x/NO_x$ was captured by reaction in the baghouse. Accordingly, the baghouse served mainly to remove suspended matter from the effluent gases.

Gas-solids contact time is an important factor from the equipment and operating costs standpoint. In developing this invention it has been established that a gas-solid contact time of 0.2 seconds is sufficient to obtain upwards of 95% $SO_2$ capture from a gas phase containing 1,000 p.p.m. $SO_2$ along with upwards of 70% capture of NO from a gas containing 300 p.p.m. NO. The remarkably low gas-solid contact time required in the operation of the invention is believed due in large measure to the fact that the non-gaseous reactants are disposed in thin films or minute particulate forms in the absence of liquid water. This situation facilitates rapid diffusion of gas phase reactants such as $SO_x$ and $NO_x$ to the surface site of reactants such as calcium hydroxide.

In the practice of this invention, various types of fluid beds or moving beds may be employed. The pressure drop across the bed is a material consideration. A dense phase fluid bed provides a greater pressure drop than the so-called fast fluid bed wherein particulates carried overhead are separated from the effluent gas in a cyclone and the solids are returned to the bed. Equipment of this type is well suited for utilization in this invention. Useful gas-solids contact times from 0.1 to 4 seconds are practical; however a preferred range is from 0.1 to 1.0 seconds.

It further has been found that the AE $(OH)_2/SO_x/NO_x$ reaction products adhere only loosely to the sand or other inert nucleating particles comprising the bed material. The sand particles tend to restrain the AE $(OH)_2$-comprising materials within the bed while reaction with $SO_x$ and $NO_x$ progresses. The reaction products formed tend to break loose from the bed material and to become entrained in the gas phase and thereby conveyed to the baghouse.

It has been found that there is little tendency for the fluidized particulates contained in the bed to form large particles by one particle adhering to another. It has been demonstrated that the alkaline earth hydroxide such as calcium hydroxide introduced and reacted with the $SO_x$ and $NO_x$ contained in the gaseous mixture, forms a finely divided particulate material that exits the reactor and is captured in the baghouse.

As is well known in the fluid bed processing art, a particle size distribution must be maintained in the bed on a continuous basis. It has been found that a particle size distribution similar to that employed in the examples to follow provides excellent results in the fluid bed embodiments of the process of the invention. Other approaches may be made as will be recognized by those skilled in the fluid bed reactor art. In the event larger particles are formed in the process, it is desirable that they be removed from the process and reduced in size as by grinding. It has been found that fines formed in the process are elutriated and pass out of the reactor with the treated gaseous effluent and preferably are removed in a particle separation device before venting occurs.

Reaction temperature control is an important feature of the invention. $SO_x$ can be captured efficiently using reactive calcium hydroxide over the entire range of 85° C.-150° C. An optimum temperature range of from about 110° C.-about 120° C. exists, however, where optimum co-reaction between $SO_x$ and $NO_x$ and capture of $NO_x$ is obtained. As indicated, the presence of oxygen and water vapor is essential and it may be that a phase comprising $Ca(OH)_2/SO_x/O_2/NO$ is a factor in accomplishing the simultaneous capture of $SO_x$ and $NO_x$ in the present process.

The moving beds, and particularly the fluidized beds, employed in this invention provide the controllable residence time and uniform temperature which are required to obtain an efficient reaction between the gaseous and non-gaseous reactants. When the desired reaction is accomplished in accordance with this invention, the solid products of reaction are easily disengaged from the bed material either by abrasive contact while exiting with the passing gas, or by external abrading means.

DESCRIPTION OF THE DRAWINGS

FIGS. 1 through 4 illustrate the equipment and flow diagrams which may be employed to practice various embodiments of the invention. In the drawings, FIG. 1 constitutes a flow diagram illustrating operation of one embodiment of the invention wherein substantially anhydrous calcium hydroxide particles are formed in situ on the surface of particles within a fluid bed from an externally produced aqueous solution or dispersion comprising calcium hydroxide.

OPERATING EXAMPLES

EXAMPLE 1

Figure 1:
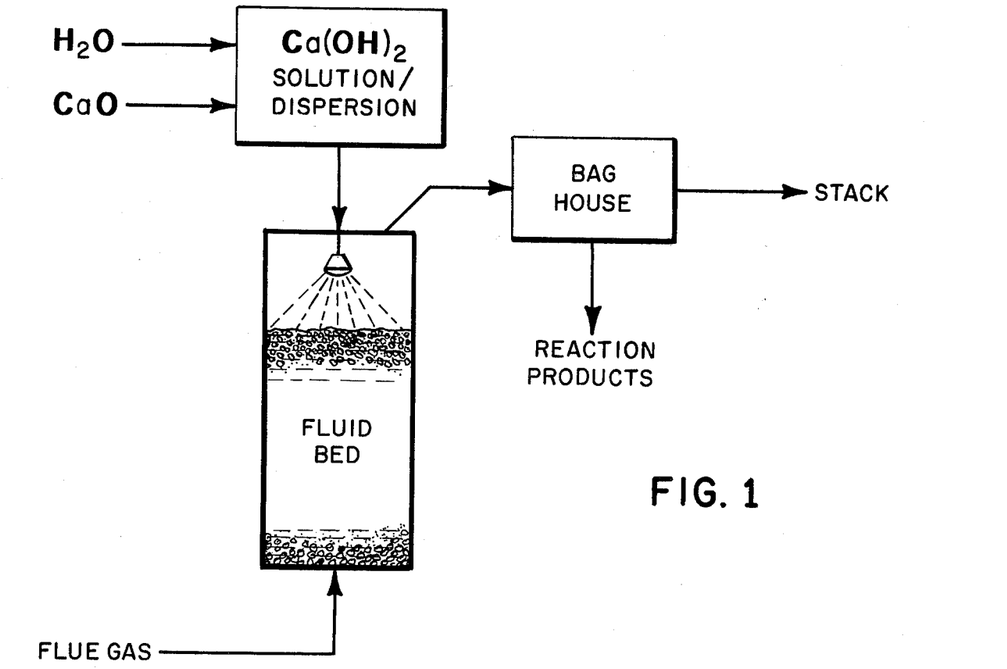

In an apparatus as shown in FIG. 1, 10 kilograms of an abrasion-resistant sand having a particle size distribution of zero percent greater than 170 microns, five percent greater than 500 microns, sixty percent greater than 355 microns, ninety percent greater than 250 microns and ninety-eight percent greater than 150 microns was placed in the fluid bed reactor to serve as an inert fluidizable medium. A simulated flue gas comprising 1000 p.p.m. $SO_2$, 300 p.p.m., NO, 5% of $O_2$ (all by volume), water vapor to obtain a dew point of 45° C., with the remainder being nitrogen, was prepared by admixing the pure materials. The simulated flue gas was heated by indirect means sufficient to bring the fluidized bed temperature to an equilibrium value of 110° C. using a free space gas flow in the bed of 1.0 meter per second. With this gas flow rate, an expanded fluid bed of 0.2 meters depth was obtained providing a gas particle contact time of 0.2 seconds. The baghouse was externally heated to maintain a bag surface temperature of about 90° C.

After the fluid bed and baghouse apparatus was brought to equilibrium temperature while passing 9.7 gram-mols of $SO_2$ and 4.5 gram-mols of NO per hour, a solution/dispersion comprising 4.5% by weight $Ca(OH)_2$ in water was introduced into the bed at a rate of 11.2 gram-mols $Ca(OH)_2$ per hour to react with the acid-forming gases in the incoming flue gas. At the onset of this aqueous feed to the fluidized bed, heat supplied to the simulated flue gas was increased to 260° C. and the fluid bed temperature maintained at 110° C. These operating conditions were maintained and the system was deemed in equilibrium when the $SO_x$ and $NO_x$ content of the effluent gas became constant. After four and one half hours of operation the effluent gas obtained a constant value and contained 50 p.p.m. $SO_2$ and 90 p.p.m. NO. Thus, 95% of the $SO_2$ and 70% of the NO simultaneously were removed from the flue gas.

The foregoing results demonstrate that under the reaction conditions employed, one mol $SO_2$ was captured for every 1.5 mol of $Ca(OH)_2$ used. Surprisingly 210 p.p.m. NO was captured in the experiment leaving only 90 p.p.m. in the exit gas. While applicants do not wish to be bound by theory, it is believed that under the reaction conditions employed, $SO_x$ and $NO_x$ interacted to mutually destroy one another.

EXAMPLE 2

Using the protocol of Example 1, the effect of fluidized bed temperature on the percent NO removal was observed as follows. In all of the runs set forth, $SO_2$ removal was essentially constant at about 95%

| Bed Temperature | % NO Removal |
| --- | --- |
| 90° C. | 50 |
| 100° C. | 59 |
| 110° C. | 70 |
| 130° C. | 68 |
| 140° C. | 60 |

The foregoing results establish that employing the process of the invention at 90° C., the % NO removal became significant and increased to 70% at 110° C. Thereafter, as the temperature was raised to 140° C., the % removal fell off to 60%.

EXAMPLE 3

A fluid bed was established as described in Example 1. Particles of CaO of less than about 16 mesh were screw fed into the bed at a controlled rate and in accordance with the $SO_2$ content of the incoming flue gas. On entering the fluid bed of sand particles, the CaO particles reacted with water vapor present to form calcium hydroxide which physically associated itself with the sand particles and then reacted with the $SO_2$ and NO to remove them from the flue gas stream. The temperature of the flue gas was maintained at 110° C. CaO particles in an amount corresponding to a stoichiometric ratio of 2.0 to the $SO_2$ present in the flue gas was introduced into the system at equilibrium. About 60% of the $SO_2$ and 50% of the NO were removed from the flue gas.

EXAMPLE 4

In this example $Ca(OH)_2$ was externally formed and then introduced to a fluidized bed which was established as described in Example 1. $Ca(OH)_2$ particles of less than about 16 mesh were fed by a screw feeder into the bed at a controlled rate in accordance with the $SO_2$ content of the incoming flue gas. On entering the fluid bed of sand particles, the $Ca(OH)_2$ particles associated themselves with the sand particles and then reacted with $SO_2$ and NO to remove them from the fluid gas stream. The same flue gas was employed as in Example 1 and was maintained at a temperature of 110° C. The $Ca(OH)_2$ particles corresponding to a stoichiometric ratio with the $SO_2$ present in the flue gas of 1.5 were introduced into the system. At equilibrium about 95% of the $SO_2$ and 65% of the NO were removed from the flue gas indicating essentially practical utilization of the $Ca(OH)_2$ and substantial interaction of $SO_x$ and $NO_x$ in the presence of in situ formed reaction products.

EXAMPLE 5

In a commercial operation conducted in accordance with the process schematically shown in FIG. 1 and described in more detail in Example 1, 22,300 ACFM of flue gas at 260° C. containing 600 p.p.m. $SO_2$, 250 p.p.m. $NO_x$, 4.5 volume % $O_2$ and water vapor corresponding to a 40° C. dew point obtained from a boiler burning a coal containing 1.14% sulfur is passed through a 8.5 m² fluidized bed reactor at a free space gas velocity of 1.0 meters per second. Material within the fluidized bed comprises, on a continuous basis, relatively abrasion resistant particulates on the surfaces of which is deposited in thin film a solution/dispersion of $Ca(OH)_2$. Water evaporation from the thin films of the deposited solution/dispersion of $Ca(OH)_2$ is essentially instantaneous within the fluidized bed in that, on a continuous basis, those few particles bearing thin films of deposited solution/dispersion of $Ca(OH)_2$ are in fluid bed contact with relatively hot dry particles which have been heated to a temperature somewhat above the average of particle temperatures existing within the fluidized bed. Substantially anhydrous, thin-surface film particulate $Ca(OH)_2$ is thus formed. Such $Ca(OH)_2$ material is readily available for reaction with $SO_x$ and $NO_x$ contained in the flue gas. On an hourly mass balance basis for every mol of $SO_2$ in the flue gas 1.5 mols of CaO is used. Effluent gas from the baghouse contains 30 p.p.m. $SO_2$ and 75 p.p.m. $NO_x$ representing 95% $SO_2$ capture and 70% $NO_x$ capture.

EXAMPLE 6

Figure 2:
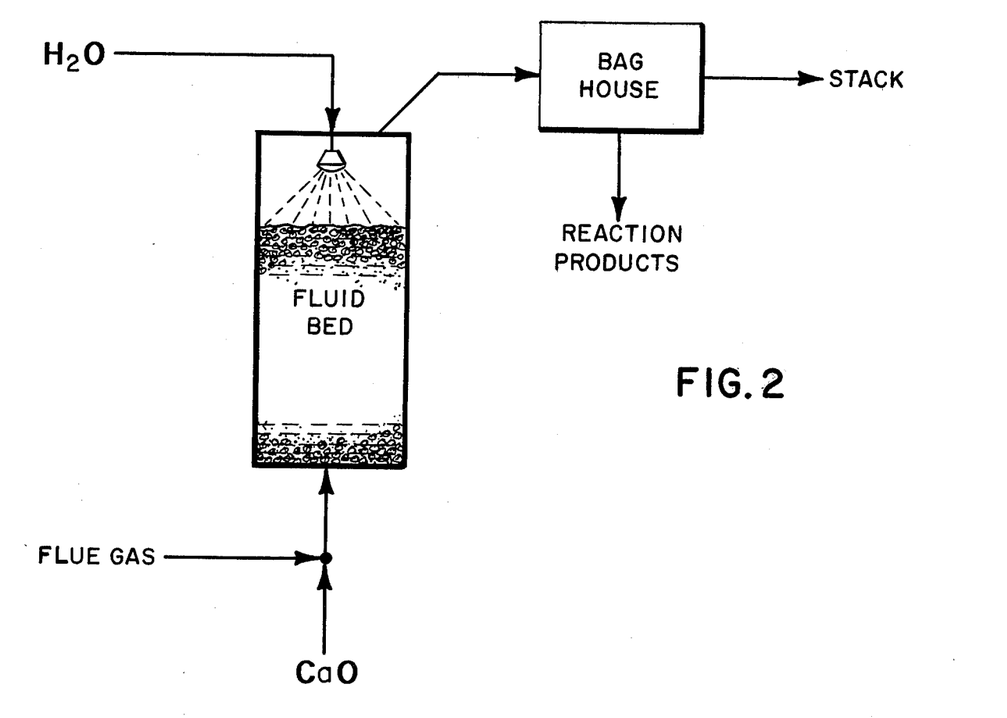
FIG. 2 is a flow diagram illustrating an embodiment wherein the substantially anhydrous calcium hydroxide particles are formed in situ by reaction of calcium oxide with water vapor.

In a commercial operation conducted in accordance with the process schematically shown in FIG. 2, a flue gas containing 600 p.p.m. $SO_2$, 250 p.p.m. $NO_x$, 2.6 volume % $O_2$ and water vapor corresponding to a dew point of 48° C. obtained from a furnace burning an oil containing 1.14% sulfur is passed through a fluidized bed reactor at a free space velocity of 1.0 meters per second. Material within the fluidized bed comprises, on a continuous basis, relatively abrasion resistant particulates in intimate contact with particulates of $Ca(OH)_2$ formed in situ by water vapor reaction with introduced particulate CaO. The $Ca(OH)_2$ particles so formed are loosely adherant to the more abrasion resistant particulates comprising the fluidized bed. The $Ca(OH)_2$ material so formed reacts readily with the $SO_x$ and $NO_x$ content of the flue gas. The formed reaction products on a continuous basis become disengaged from the bed material and are elutriated out of the bed and recovered as product in the baghouse. On an hourly mass basis 2.0 pound mols of CaO is introduced into the bed per pound mol $SO_2$ in the flue gas. Effluent gas from the baghouse contained 240 p.p.m. $SO_2$ and 125 p.p.m. $NO_x$ representing 60% $SO_2$ capture and 50% NO capture.

EXAMPLE 7

Figure 3:
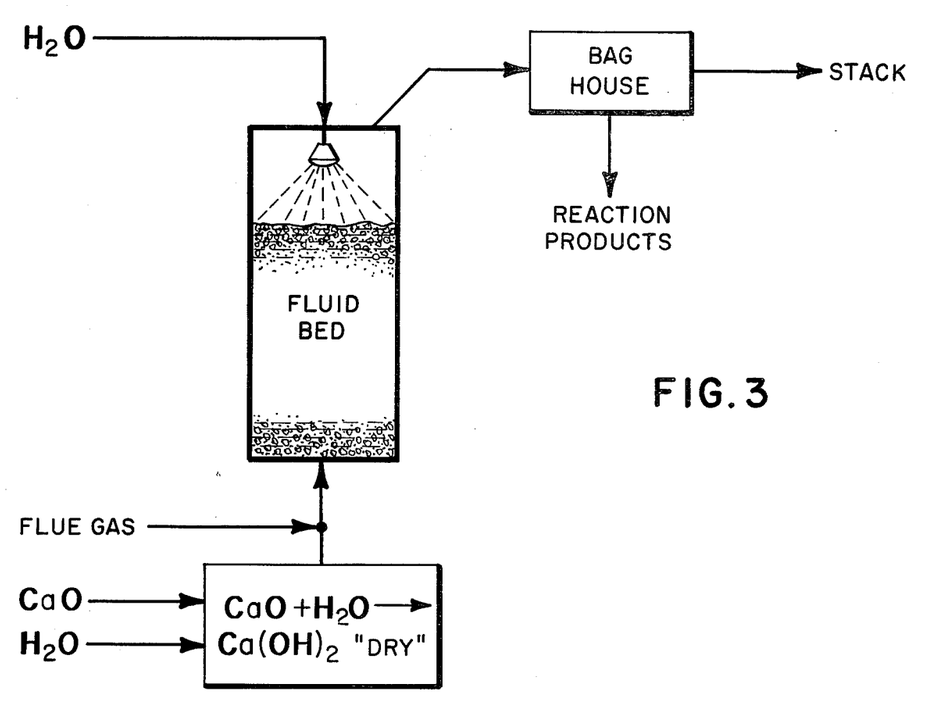
FIG. 3 presents a flow diagram which illustrates an embodiment of the invention in which substantially anhydrous calcium hydroxide particles are formed outside the fluidized bed and introduced for purposes of the reaction.

In a commercial operation conducted in accordance with the process schematically shown in FIG. 3, 22,300 ACFM of a flue gas at 260° C. containing 600 p.p.m. $SO_2$, 250 p.p.m. NO, 2.6 volume % $O_2$, and water vapor corresponding to a 48° C. dew point obtained from a furnace burning 1.14% sulfur oil is passed through a fluidized bed reactor at a free space velocity of 1.0 meters per second. Material within the bed comprises on a continuous basis, relatively abrasion resistant particulates in intimate contact with particulates of $Ca(OH)_2$ formed outside of the fluidized bed and introduced thereto. The $Ca(OH)_2$ utilized in this example is a commercially available dry hydrate of calcium oxide prepared by the carefully controlled reaction between calcine and water such that a pulverulent dry product is obtained rather than a putty or solution/dispersion which is obtained via wet slaking procedures. As shown in FIG. 3 the pulverulent dry calcium hydrate is introduced into the fluidized bed reactor where the particulates become interdispersed and transiently associated with the existent bed material. The dispersed substantially anhydrous $Ca(OH)_2$ reacts readily with the $SO_x$ and $NO_x$ content of the flue gas. On a continuous basis products of reaction are elutriated from the bed and captured in the baghouse. On an hourly mass basis for every pound mol of $SO_2$ contained in the flue gas 1.5 pound mols of $Ca(OH)_2$ is introduced into the reactor. Gas from the baghouse contains 30 p.p.m. $SO_2$ and 87 p.p.m. NO representing an $SO_x$ capture of 95% and an $NO_x$ capture of 65%.

EXAMPLE 8

Figure 4:
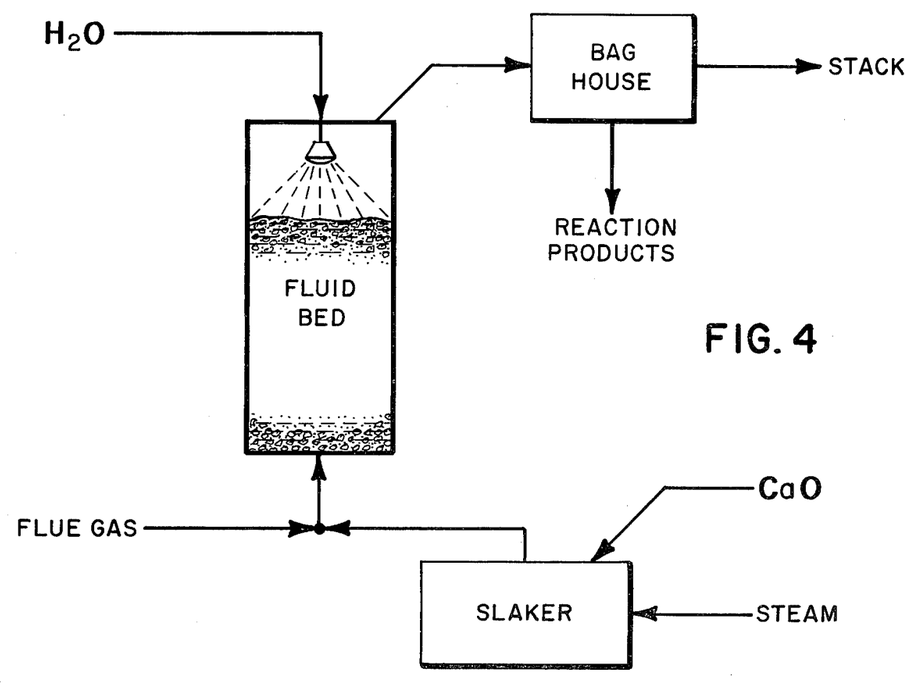
FIG. 4 presents a flow diagram which illustrates an embodiment of the invention using externally produced micron and submicron particles of calcium hydroxide. The processes conducted with the apparatus of the drawings will be referred to and described in the following examples.

In a commercial operation, conducted in accordance with the process schematically shown in FIG. 4, and generally described in Example 1 with the exception that the $Ca(OH)_2$ is produced in a unique way so that the majority of the particles are in the submicron range, wherein 22,300 ACFM of flue gas at 260° C. containing 600 p.p.m. $SO_2$, 250 p.p.m. $NO_x$, 2.6 volume % $O_2$, and water vapor corresponding to a dew point of 48° C. obtained from a furnace burning an oil containing 1.14% sulfur is passed through a fluidized bed reactor at a free space velocity of 1.0 meters per second. Material within the bed comprises, on a continuous basis, relatively abrasion resistant particulates in intimate association with the introduced micron and submicron particulates of $Ca(OH)_2$. The $Ca(OH)_2$ particulates so produced are readily reactive towards $SO_x$ and $NO_x$ contained in the flue gas. The products of reaction are loosely adherent to the material in the bed. On a continuous basis products of reaction are elutriated from the bed and captured in the baghouse. On an hourly mass basis 1.5 pound mols of CaO per pound mol of $SO_2$ in the flue gas are charged to the attrition/hydration system where nascent micron and submicron sized $Ca(OH)_2$ particulates are produced. Said material is introduced, without cooling, into the fluid bed reactor. Effluent gas from the baghouse contained 30 p.p.m. $SO_2$ and 75 p.p.m. $NO_x$ which corresponds to an $SO_2$ capture efficiency of 95% and an $NO_x$ capture efficiency of 70%.

The foregoing example demonstrates the utility of what is believed to be a new form of $Ca(OH)_2$ particulates not heretofore described in the art. The process of reacting CaO and water vapor under high particle shear conditions, existent in an attrition mill, makes possible utilization of the heat of reaction evolved when CaO reacts with water. This explosive reaction makes possible to economic production of micron and submicron particulate $Ca(OH)_2$ as employed in this example.

Since additional objects and embodiments of the invention may occur to those skilled in the art after reading the foregoing specification, it is intended that the invention be limited only by the scope of the appended claims.

We claim:

1. A process for treating a gaseous mixture containing $SO_x$ and $NO_x$ wherein the molar ratio of $NO_x$ to $SO_x$ is 3 or below and wherein both $SO_x$ and $NO_x$ are removed which comprises:
   a. providing a reactor for particulate material wherein the particles are in motion relative to each other;
   b. said particles having a surface comprising alkaline earth hydroxide reactable with said $SO_x$ and $NO_x$, in admixture with the reaction products of said $SO_x$ and $NO_x$ and alkaline earth hydroxide;
   c. contacting the particles in said reactor with the gaseous mixture at a temperature of between about 85° C. and about 150° C. in the presence of at least 0.5% by volume oxygen and water vapor but in the absence of a substantial quantity of liquid water;
   d. thereby substantially reducing the amount of $SO_x$ and $NO_x$ in the gaseous mixture.

2. A process in accordance with claim 1 in which the surface of the particles is in substantial part formed within the bed by reaction of $SO_x$ and $NO_x$ with substantially anhydrous alkaline earth hydroxide formed on the particles by dehydration of a preformed solution or dispersion of alkaline earth hydroxide.

3. A process according to claim 1 in which the alkaline earth reagent is calcium hydroxide.

4. A process in accordance with claim 1 in which the surface of the particles is in substantial part formed within the reactor by reaction of an alkaline earth oxide introduced to the reactor and water vapor, oxygen and $SO_x$ and $NO_x$ of the gaseous mixture.

5. A process in accordance with claim 1 in which the surface of the particles is in substantial part formed within the reactor by reaction of calcium oxide introduced to the reactor and water vapor, 6. A process in accordance with claim 1 in which the surface of the particles is in substantial part formed within the reactor by reaction of a preformed hydrated alkaline earth oxide introduced to said reactor with the oxygen, water vapor and $SO_x$ and $NO_x$ of the gaseous mixture.

7. A process for treating a gaseous mixture containing $SO_x$ and $NO_x$ wherein the molar ratio of $NO_x$ to $SO_x$ is 3 or below and wherein both $SO_x$ and $NO_x$ are removed which comprises:
   a. providing in a reactor a bed of particulate material wherein the particles are in motion relative to each other;
   b. said particles having a surface comprising hydrated alkaline earth oxide in admixture with the reaction products of $SO_x$ and $NO_x$ and said oxide;
   c. contacting the particles in said bed with the gaseous mixture at a temperature of between about 85° C. and about 150° C. in the presence of at least 0.5% by volume oxygen and water vapor but in the absence of a substantial quantity of liquid water;
   d. to thereby substantially reduce the amount of $SO_x$ and $NO_x$ in the gaseous mixture;
   e. removing reacted particulate material from the bed on a continuous basis;
   f. abrading the surfaces of at least part of the removed particles, and returning at least part of the abraded particles to the reactor on a continuous basis;
   g. sizing the particles to remove both fines and coarse fractions therefrom and returning the mid cut to the reactor.

8. A process in accordance with claim 16 in which the bed is fluidized bed.

9. A process in accordance with claim 7 in which the particles comprise an abrasion resistant non-porous core upon which the alkaline earth hydroxide is deposited.

10. A process in accordance with claim 7 in which particulates are continuously removed from the bed, reaction products are separated from the core and the core is returned to the bed.

11. A process for treating a gaseous mixture containing both sulfur oxides and nitrogen oxides wherein the molar ratio of $NO_x$ to $SO_x$ is below 3 and wherein both $SO_x$ and $NO_x$ are removed which comprises:
   a. providing a fluidizable bed of particles comprising an inert nonporous material;

b. passing a heated waste gas comprising sulfur oxides and nitrogen oxides through the bed of particulates to maintain a temperature between about 85° C. and 150° C. and to fluidize the particles;

c. dispersively introducing a solution or dispersion of an alkaline earth hydroxide to the bed, said solution or dispersion contacting the heated surfaces of the fluidized particles whereby water is evaporated, said alkaline earth hydroxide is deposited on the particles and absorption reactions with the sulfur and nitrogen oxides occur in the presence of at least 0.5% by volume oxygen and water vapor but in the absence of a substantial quantity of liquid water; and d. passing effluent gases from the fluidized bed to a particle separation device to remove particulates from said gases.

12. A process according to claim 11 in which a portion of the particulates are withdrawn from the bed, reaction products are removed therefrom and at least a portion of the particles are returned to the bed.

13. A process according to claim 11 in which the alkaline earth hydroxide is calcium hydroxide and is formed within the bed by introduction of calcium oxide which reacts with water vapor contained in the gaseous mixture to form said calcium hydroxide.

14. A process according to claim 20 in which the alkaline earth hydroxide is calcium hydroxide and is preformed by hydration of CaO and then is introduced to the bed.

15. A process according to claim 11 in which the temperature of the bed is maintained between about 110° C. and 120° C.

16. A process according to claim 20 in which the mols of alkaline earth hydroxide employed is between 0.9 and 1.5 mols reagent to the $SO_x$ in waste gas, the oxygen content of the waste gas is at least 1.5 volume percent and the content of water vapor is at least the equivalent of a 40° C. dew point.

17. A process according to claims 1 or 11 in which the particulates comprising the bed are formed in situ by reaction between the alkaline earth hydroxide and $SO_x$ and $NO_x$ of the gaseous feed mixture, and the bed is maintained under equilibrium operating conditions by continuously removing a portion of the bed material, removing part of the solid reaction products therefrom and returning at least part of the said portion to the bed for further contact with the $SO_x$ and $NO_x$ content of the gaseous mixture feed to the process.

18. A process according to claims 1 or 11 in which the waste gases contain fly ash and a substantial amount of said fly ash is captured with reaction product particles formed in the bed.

19. A process according to claims 1 or 11 in which the waste gases contain fly ash and said fly ash is captured with particles formed in the bed and a portion of the said fly ash is recovered in a particulate recovery device disposed downstream from the bed.

20. A process according to claims 1 or 11 in which finely divided liquid water is introduced into the bed, and is therein vaporized as a temperature control means before it can react with either $SO_x$ and $NO_x$ of the feed mixture or with the alkaline earth hydroxide.

21. A process according to claims 1 or 11 in which the temperature of the bed is controlled by heat exchange between the particles and an external medium.

* * * * *

UNITED STATES PATENT AND TRADEMARK OFFICE
CERTIFICATE OF CORRECTION

PATENT NO. : 4,442,080
DATED : April 10, 1984
INVENTOR(S) : James R. Donnelly, Karsten S. Felsvang, Per Morsing, and
Preston L. Veltman It is certified that error appears in the above—identified patent and that said Letters Patent is hereby corrected as shown below:

Claim 1, line 11, before "alkaline" insert -- said --;

Claim 5, line 4, after "vapor," insert -- oxygen and $SO_x$ and $NO_x$ of the gaseous mixture. --

Claim 8, line 1, delete "16" and insert therefor -- 7 --.

Claim 14, line 1, delete "20" and insert therefor -- 11 --.

Claim 16, line 1, delete "20" and insert therefor -- 11 --.

Signed and Sealed this

Fourth Day of September 1984

[SEAL]

Attest:

GERALD J. MOSSINGHOFF

Attesting Officer

Commissioner of Patents and Trademarks